United States Patent [19]
Schmitz et al.

[11] 3,815,266
[45] June 11, 1974

[54] STUMP PULLING IMPLEMENT

[76] Inventors: James E. Schmitz, Box 94, Ventura, Iowa 50482; Duard J. Suby, Rt. 1, Clear Lake, Iowa 50428

[22] Filed: Dec. 1, 1972

[21] Appl. No.: 311,113

[52] U.S. Cl............... 37/2 R, 172/175, 172/177, 37/80 A, 172/605
[51] Int. Cl............................................ A01g 23/06
[58] Field of Search............ 37/2, 80, 91; 172/698, 172/605, 145, 149, 174–177, 183; 294/19

[56] References Cited
UNITED STATES PATENTS

| | | | |
|---|---|---|---|
| 121,846 | 12/1871 | Bussell | 37/80 A |
| 645,957 | 3/1900 | Jackson | 37/80 R |
| 991,452 | 5/1911 | Park | 172/175 |
| 1,074,619 | 10/1913 | Harned | 172/698 X |
| 1,631,639 | 6/1927 | McDonald | 37/80 R |
| 2,329,794 | 9/1943 | Speck | 172/177 |
| 2,339,905 | 9/1944 | Baker | 172/698 X |
| 2,523,263 | 9/1950 | Anderson | 37/2 R |
| 2,758,528 | 8/1956 | Hulverson | 37/2 R |
| 2,760,283 | 8/1956 | Lee | 37/2 R |
| 2,952,322 | 9/1960 | Jurcheck | 172/698 X |

*Primary Examiner*—Robert E. Pulfrey
*Assistant Examiner*—Eugene H. Eickholt
*Attorney, Agent, or Firm*—Zarley, McKee and Thomte

[57] ABSTRACT

An implement frame includes a pair of horizontally spaced apart rearwardly extending horizontally pivotal arms which include stump-engaging wheels on their free ends. The stump-engaging wheels are tilted inwardly at their bottom and rear edges. The peripheral edges of the wheels include teeth elements for engagement with the ground and stumps. A hitch means includes a pair of rearwardly extending cables connected to the arms and to a rod member extending through a tongue sleeve. The clamping action on the stumps by the wheels is directly related to the pulling action required to move the implement forward and to lift the stump out of the ground. The implement frame includes rearwardly extending support arms on opposite sides of the stump wheel arms and ground support wheels are provided on the support arms. A power cylinder is connected to each of the support arms for adjustably pivoting the arms to vary the height of the stump wheels above the ground. The roots of the stumps are cut by a pair of spaced apart discs and chisel plows. A spring may be placed between the cables to provide for a smooth pulling action. An alternate hitch includes the rod member extending to adjacent the stump wheels and having outwardly extending pivotal elements connected to the arms.

17 Claims, 6 Drawing Figures

PATENTED JUN 11 1974 3,815,266
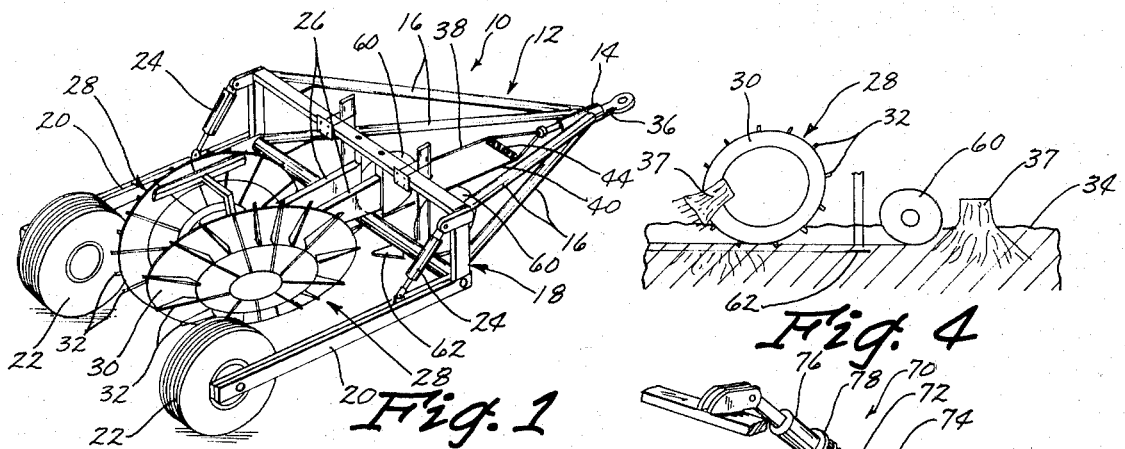
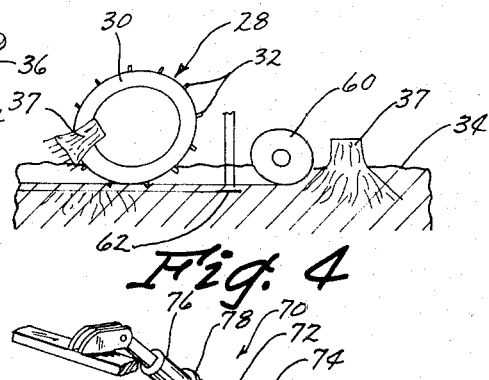
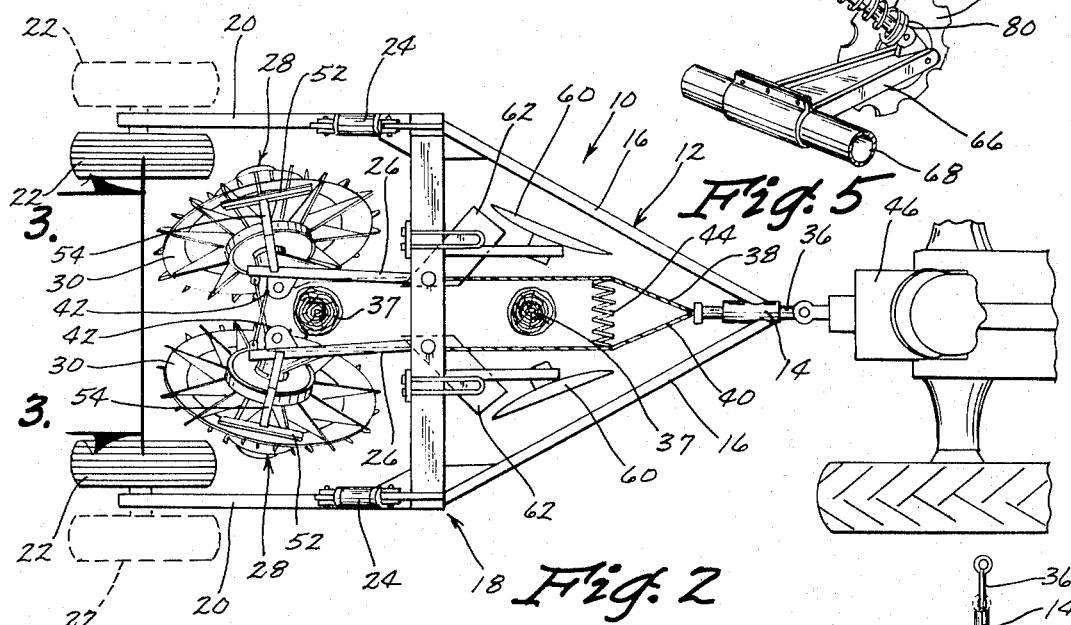
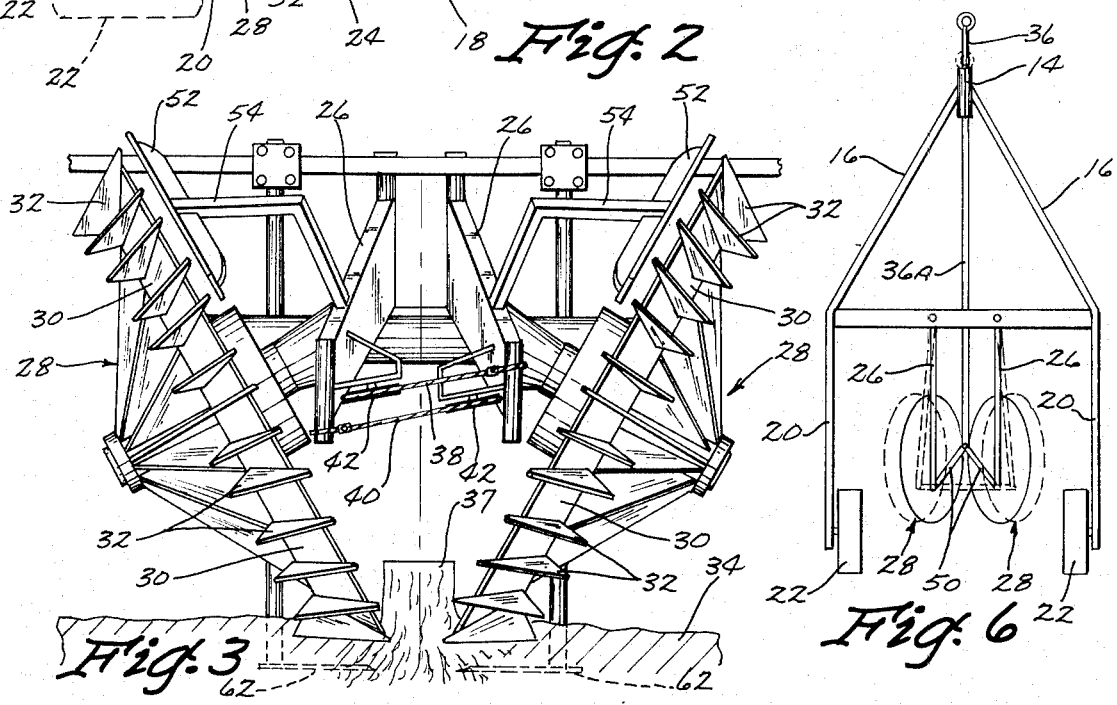
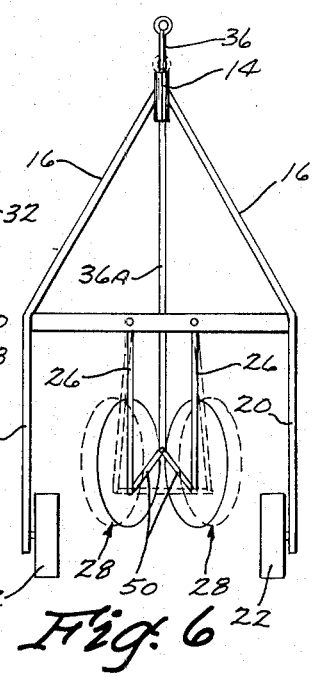
Fig. 1
Fig. 2
Fig. 3
Fig. 4
Fig. 5
Fig. 6

STUMP PULLING IMPLEMENT

The usual procedure for removing stumps is to use a bulldozer with a blade on the front end. This is a crude and ineffective system since the blade applies only a shearing force to the stumps and does not function to lift the stumps from the ground. Even though heavy equipment is utilized it is very easy to cause damage to the equipment.

The stump-pulling implement of this invention involves a minimum number of parts and converts a horizontal pulling action of the prime mover into a vertical lifting action. The implement can readily move from one stump to another in a row of stumps and lift each of them cleanly out of the ground. The size of the stumps may vary as the machine has automatic size sensing capabilities. Furthermore, the gripping wheels being carried on pivotal arms are self-aligning to each stump. The gripping force between the wheels on the stump is directly related to the pulling action required to move the implement and lift the stump from the ground since the vehicle is moved by the hitch being connected directly to the pivotal arms carrying the stump-engaging wheels. As the pulling force increases the arms are pulled closer together causing the stump wheels to bite harder into the stumps thereby enhancing their capability to maintain engagement with the stump as it is lifted from the ground. The stump is engaged by the stump wheels in a plane substantially through the rotational axes of the stump wheels and since the stump wheels are tilted inwardly at the bottom and rearward edges the continued forward movement causes the wheels to produce a fulcrum increasing in length as the wheels continue to turn and their engagement moves further from the vertical plane through the rotational axis of the stump wheels. Teeth are provided on the wheels for engaging the ground to cause the wheels to turn and also for engaging the stumps therebetween. The roots on the sides of the stumps are cut by forwardly positioned discs and plow shovels. The height of the implement an in particular the height of the stump-engaging wheels is adjustable by rearwardly extending support arms having wheels at their rear ends being pivoted up and down by hydraulic cylinders on each side. Alternate hitch arrangements are provided and in the first arrangement a pair of cables is connected at their forward ends to a rod member slidably positioned in a sleeve on the tongue of the implement The rear ends of the cable extend along the pair of arms and then cross laterally over to the opposite arm to which the cable ends are connected whereby the forward pull on the tongue member causes the arms to pivot toward each other and in turn move the stump wheels into engagement with the stumps. The vehicle itself is pulled by this action since the arms to which the cable ends are connected are connected also to the implement frame. The second hitch arrangement includes the tongue member extending rearwardly to adjacent the stump wheels and includes outwardly extending pivotal members connected directly to the pair of arms whereby forward pull on the tongue member will cause the arms to move closer towards each other.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a perspective view of the stump-pulling implement of this invention.

FIG. 2 is a top plan view thereof.

FIG. 3 is a rear elevation view taken along line 3—3 in FIG. 2.

FIG. 4 is a reduced in scale side elevation view showing the stump-pulling implement in operation.

FIG. 5 is a fragmentary perspective view of the mounting structure for the discs.

FIG. 6 is a reduced in scale top diagrammatic view of the implement illustrating an alternate hitch arrangement.

The stump-pulling implement of this invention is referred to in FIG. 1 generally by the reference numeral 10 and includes a forward tongue structure 12 having a sleeve 14 at the apex of forwardly extending side frame members 16. The side frame members 16 are connected to the top and bottom sides of an upstanding transversely extending frame 18. A pair of support arms 20 are pivotally connected to the lower side of the upstanding frame 18 and extend rearwardly therefrom. Ground-engaging wheels 22 are provided on the free ends of the support arms 20 and may be positioned on either side as seen in FIG. 2. A hydraulic cylinder 24 extends between the arms 20 and the upper edge of the upstanding frame assembly 18 to selectively position the frame above the ground.

The upstanding frame 18 includes on opposite sides of a longitudinally extending centerline of the vehicle a pair of horizontally pivotal arms 26 which extend rearwardly and include on their free ends stump-engaging wheels 28. The wheels 28 are positioned, as seen in FIG. 2, such that they are tilted inwardly at the bottom and rear edges. The outer periphery of the wheels is defined by an annular plate 30 which cooperates with a plurality of triangular shaped teeth 32 to engage the ground 34 to cause rotation of the wheels and also engage a stump 36 to be lifted from the ground. The principal stump-gripping action occurs between the plates 30 while the turning action of the wheels is the result of the teeth 32 engaging the ground 34.

A hitch rod 36 is slidably positioned in the tongue sleeve 14 and is connected at its rear end to a pair of cables 38 and 40 which extend rearwardly along the arms 26 over pulleys 42 and thence to the end of the opposite arm where the cables are anchored. A spring 44 is provided between the cables at the forward end to smooth out the pulling action. Thus it is seen as the tractor 46 pulls the rod 36 forwardly the cables in turn connected to the arms 26 pivot the arms inwardly thereby causing the wheels 28 to bite into the stump 36.

An alternate hitch arrangement is seen in FIG. 6 wherein the hitch rod 36A extends rearwardly to adjacent the wheels 28 and outwardly extending pivot members 50 are connected between the rod 36A and the arms 28 and accordingly when the hitch rod 36A is pulled forwardly the arms 26 are pivoted inwardly causing the wheels 28 to bite into the stump 37. It is seen that the amount of pressure on the stump 37, while varying directly with the forward force required to move the implement forward, also varies somewhat between the two hitch arrangements. In the hitch arrangement of FIG. 2, the inwardly pulling force is approximately the same for all positions of the arms 26 while in the arrangement of FIG. 6 the inward pulling action is greatest when the wheels 28 are the farthest apart since as the members 50 move more into a parallel relationship their inward pulling action tends to diminish although it remain sufficient to lift the stump from the ground.

Dirt and debris that tends to collect on the outer periperal edges of the wheels 28 is cleaned therefrom by cleaning blades 52 carried on arms 54 extending from the arms 26 as seen in FIG. 3.

The root structure of the stumps 36 is cut along the sides by a pair of disc blades 60 and plow shovels 62 positioned in substantial alignment with the wheels 28. The disc elements 60 are carried on horizontally positioned pivotal arms 66 connected to transversely extending frame member 68 in the upstanding frame assembly 18. A spring assembly 70 extends between the forward end of the disc arm 66 and the upper edge of the frame assembly 18 and includes a coil spring 72 interconnecting a pair of telescoping members 74 and 76. The spring bears against annular flanges 78 and 80.

Thus in operation it is seen in FIG. 2 that the implement is driven down a row of stumps and the disc wheels 60 function to cut the roots in cooperation with the plow shovel 62, as seen in FIG. 3. The stump-engaging wheels 28 are self-sizing and self-aligning onto the individual stumps and engage the stumps at approximately a vertical plane through the rotational axes of the wheels 28. Since the wheels are closer at the bottom and rearward edges the gripping action increases as the implement moves forward and also the fulcrum length increases from zero to the radius of the wheels 28 which is at a maximum when the wheels have rotated ninety degrees. Any debris collected on the wheels will be removed by the stationary blades 52. The gripping action is directly related to the forward force required to move the implement and lift the stumps. The teeth 32 while functioning to engage the stumps also and primarily cause the wheels to rotate as the implement is moved forward thereby necessarily causing the stumps to be lifted out of the ground as the implement is moved. The hitch may include the structure of FIG. 2 or that of FIG. 6 as desired and it is noted that the cable arrangement of FIG. 2 will provide constant and continuous pressure on the arms 26 regardless of their spacing while the inward pulling action on the arms 26 in FIG. 6 will vary with the spacing being at a maximum when the arms are spaced at a maximum distance apart. The height of the wheels above the ground can be reaily varied by selectively adjusting the power cylinders 24.

It is understood that clamping pressure may be applied to the stump-engaging wheel arms independently of the hitch structure by, for example, the use of a hydraulic system which would apply variable pressure to arms to provide the necessary clamping action to cause the stump-engaging wheels to not slip relative to the stump being pulled.

We claim:

1. A stump-pulling implement comprising,
a frame,
a pair of arms pivoted at their forward ends to said frame,
a ground and stump-engaging wheel on each arm, and
hitch means connected to said arms for pivoting the arms towards each other to provide a clamping action between the wheels thereby causing said wheels to grip a stump therebetween and lift it out of the ground by said wheels rotating forwardly as said implement is moved forwardly upon a forward force being applied to said hitch means.

2. The structure of claim 1 wherein said stump wheel arms are pivoted for horizontal swinging movement and the gripping action between said wheels and a stump varies directly with the pull required to move said implement forwardly and lift said stump out of the ground.

3. The structure of claim 2 wherein said wheels are tilted inwardly along their bottom edges.

4. The structure of claim 2 wherein said wheels are tilted inwardly along their rearward and bottom edges whereby said wheels are spaced closer together along their bottom and rear edges than along the top and forward edges.

5. The structure of claim 4 wherein a plurality of teeth are provided around the periphery of said wheels for engaging stumps between said wheels.

6. The structure of claim 3 wherein said vehicle is dependent for its forward driving force entirely upon said forward force applied by said hitch means to said arms.

7. The structure of claim 4 wherein said hitch means includes a pair of cables connected together at their forward ends and extending rearwardly along said arms to adjacent said rear ends and thence laterally to engagement with the opposite arm.

8. The structure of claim 7 wherein a spring means is provided between said cables adjacent their forward ends to cushion the pull on said arms.

9. The structure of claim 7 wherein said hitch means further includes a tongue connected to said cables at their forward ends and a sleeve is provided on said frame and said tongue is movably received in said sleeve.

10. The structure of claim 4 wherein said hitch means is further defined as including a tongue which is positioned between said arms and includes a pair of pivotal wing elements having their rear ends pivotally connected to said arms.

11. The structure of claim 4 wherein a pair of root cutting disc wheels are provided on said frame.

12. The structure of claim 11 wherein said disc wheels are provided on horizontally extending pivot arms and a spring means extends vertically from said frame to said pivot arms to cushion them.

13. The structure of claim 4 wherein said frame includes a forward tongue assembly and a transversely extending upstanding frame assembly on the rear of said tongue assembly, a pair of wheels on support arms pivotally connected to opposite ends of said upstanding frame assembly and said support arms extend rearwardly parallel to said pair of arms carrying said stump engaging wheels, and power means for adjustably pivoting said supprot arms to vary the elevation of said stump-engaging wheels.

14. The structure of claim 13 wherein said power means include hydraulic cylinders extending between said arms and said upstanding frame.

15. The structure of claim 4 wherein a scraper is positioned on each of said stump-engaging wheel arms for cleaning the inside peripheral edges of said stump-engaging wheels.

16. The structure of claim 4 wherein a pair of spaced apart plow shears are provided ahead of and in line with said stump-engaging wheels for cutting the roots on opposite sides of stumps.

17. The structure of claim 1 wherein said stump wheel arms are pivoted for horizontal swinging movement and the gripping action between said wheels and a stump varies directly with the pull required to move said implement forwardly and lift said stump out of the ground.

* * * * *